(12) United States Patent
Jayasimha et al.

(10) Patent No.: US 8,879,982 B2
(45) Date of Patent: Nov. 4, 2014

(54) AUTOMATIC UPLINK POWER CONTROL IN INTERFERENCE CANCELLATION BASED SPECTRAL REUSE

(75) Inventors: Sriram Jayasimha, Bangalore (IN); Praveen K. Tangutoori, Hyderabad (IN); Jyothendar Paladugula, Hyderabad (IN)

(73) Assignee: EMC Satcom Technologies, LLC, Miami, FL (US)

( * ) Notice: Subject to any disclaimer, the term of this patent is extended or adjusted under 35 U.S.C. 154(b) by 519 days.

(21) Appl. No.: 13/280,616

(22) Filed: Oct. 25, 2011

(65) Prior Publication Data

US 2012/0100800 A1    Apr. 26, 2012

Related U.S. Application Data

(60) Provisional application No. 61/406,822, filed on Oct. 26, 2010.

(51) Int. Cl.
*H04B 7/185* (2006.01)
*H04W 4/00* (2009.01)
*H04B 1/10* (2006.01)

(52) U.S. Cl.
CPC .............. *H04B 7/18543* (2013.01); *H04B 1/10* (2013.01)
USPC ........................ 455/12.1; 455/3.02; 455/427

(58) Field of Classification Search
CPC ................................ H04B 7/18543; H04B 1/10
USPC ............. 455/3.03, 12.1, 13.2, 98, 427, 404.1, 455/404.2, 456.1; 701/213; 244/158.1, 244/158.4, 158.6
See application file for complete search history.

(56) References Cited

U.S. PATENT DOCUMENTS

| 5,907,541 | A  | * | 5/1999 | Fairholm et al. | 370/316 |
| 6,441,793 | B1 | * | 8/2002 | Shea | 343/753 |
| 6,498,922 | B1 | * | 12/2002 | Lazaris-Brunner et al. | 455/12.1 |
| 6,636,734 | B1 | * | 10/2003 | Berger et al. | 455/427 |
| 7,522,877 | B1 |   | 4/2009 | Avellan et al. | |
| 7,907,894 | B2 |   | 3/2011 | Avellan et al. | |
| 8,233,840 | B2 | * | 7/2012 | Agarwal | 455/13.2 |
| 2004/0166801 | A1 | * | 8/2004 | Sharon et al. | 455/12.1 |
| 2005/0068994 | A1 | * | 3/2005 | DiCamillo et al. | 370/538 |
| 2005/0207375 | A1 | * | 9/2005 | Schiff | 370/331 |
| 2008/0274690 | A1 |   | 11/2008 | Laufer | |
| 2008/0274960 | A1 |   | 11/2008 | Amano et al. | |
| 2009/0213780 | A1 | * | 8/2009 | Dankberg | 370/316 |
| 2009/0316621 | A1 | * | 12/2009 | Lane et al. | 370/326 |
| 2010/0062706 | A1 | * | 3/2010 | Mills et al. | 455/13.2 |

OTHER PUBLICATIONS

Crane, Robert K. "Prediction of Attenuation by Rain", IEEE Transaction on Communications, vol. COM-28, No. 9, Sep. 1980, pp. 1717-1733.

\* cited by examiner

*Primary Examiner* — Dominic E Rego
(74) *Attorney, Agent, or Firm* — Blank Rome LLP

(57) ABSTRACT

A system and method for performing automatic uplink power control (AUPC), using interference cancellation, to compensate for signal attenuation in a satellite communication system in which uplink path attenuation, forward channel attenuation, or both are estimated at a hub station without requiring signal quality reports from a remote station, and without requiring a satellite beacon. Estimates of uplink path attenuation or forward channel attenuation are used by the hub station to control the output power of a transmitted signal, thereby compensating for the estimated attenuation.

17 Claims, 2 Drawing Sheets

AUTOMATIC UPLINK POWER CONTROL IN INTERFERENCE CANCELLATION BASED SPECTRAL REUSE

CROSS-REFERENCE TO RELATED APPLICATIONS

This patent application claims the benefit of U.S. Provisional Patent Application No. 61/406,822 filed Oct. 26, 2010, the entirety of which is incorporated herein by reference.

BACKGROUND OF THE INVENTION

1. Field of the Invention

The present invention relates to satellite communication systems. In particular, the present invention relates to a satellite communication system that utilizes automatic uplink power control to compensate for signal attenuation.

2. Description of the Related Art

Satellite communication systems typically include a terrestrial hub station that transmits a signal to a space-borne satellite, after which the satellite transmits the signal to a terrestrial receiver station. Signals transmitted from a terrestrial station and received by a satellite are referred to as uplink signals, and signals transmitted from a satellite and received by a terrestrial station are referred to as downlink signals. These signals are often subject to attenuation, also referred to as path loss or fading, due to atmospheric factors such as rain, water vapor, clouds, and fog along the wave propagation paths of the signals. In such instances, it is desirable to compensate for signal attenuation in order to maintain a constant energy per bit to noise power spectral density ratio ($E_b/N_0$), and accordingly a constant signal to noise ratio (SNR), at the receiver. A purpose of maintaining a constant $E_b/N_0$ is to ensure signal reliability while optimizing the transmission power of the system. In instances in which attenuation due to rain occurs specifically along an uplink path, a constant SNR at the receiver may be achieved by maintaining a constant flux density at the satellite. One such system is described by U.S. Pat. App. Pub. No. 2008/0274960 to Laufer (US 2008/0274960), the entirety of which is incorporated herein by reference.

To compensate for attenuation, prior art systems have employed automatic uplink power control (AUPC), in which the output power on the uplink signal is adjusted to maintain a constant $E_b/N_0$ at the receiver. Automatic uplink power control is particularly useful at frequencies such as the Ku-band, in which rain is the primary cause of signal attenuation. At much higher frequencies, above 60 GHz, other factors, such as clouds, have a greater effect on signal attenuation than at lower frequencies.

Satellite modems in some point-to-point communications systems have provided transmit power control based on link performance. For example, US 2008/0274960 describes a system in which a hub transmits a signal to a satellite via an uplink, and the satellite relays that signal to a remote station via a downlink. Both the uplink and downlink signals are subject to weather-related attenuation. The overall attenuation (i.e., the sum of both uplink and downlink attenuation) is measured at the remote station and the measurement is transmitted to the hub, where the uplink output power is adjusted to compensate for the measured attenuation. Because compensation in such systems is based on the sum of both uplink and downlink attenuation, the method of power control employed by those systems is inappropriate for point-to-multipoint and other systems in which the attenuation of downlink signals transmitted to multiple receivers may vary significantly. Moreover, attempts to boost the uplink output power to compensate for both uplink and downlink attenuation may saturate satellite transponders.

The system described by US 2008/0274960 is one in which the uplink attenuation is estimated based on the overall attenuation, which is measured at a remote station. The estimate is transmitted from the remote station to a hub, where uplink power control is used to compensate for the estimated uplink attenuation, such that a constant flux density is maintained at the satellite. The downlink attenuation is also estimated based on the overall attenuation, and adaptive coding and modulation (ACM) is used to compensate for downlink attenuation, thereby achieving the desired link performance at the cost of bandwidth. Systems such as the one described by US 2008/0274960 require sufficient time for a hub to transmit a signal to a remote station via satellite and for the remote station to transmit estimated attenuation information back to the hub before the output power of the hub is adjusted to compensate for the estimated attenuation.

U.S. Pat. No. 7,120,392 to Chu et al., the entirety of which is incorporated herein by reference, describes a system that employs a satellite beacon, which is a signal having a frequency different than that of the uplink signal. The beacon is generated by a satellite, and transmitted to a receiver at a hub station. By taking into account the signal strength of the beacon, and the frequency difference between the beacon and the uplink signal, the uplink attenuation is estimated, and uplink power control is used to compensate for the uplink attenuation only. A constant flux density at the satellite is therefore maintained. Systems that employ satellite beacons require that receivers be specially configured to receive the beacon signals.

Accordingly, there exists a need to provide a system in which automatic uplink power control is used to maintain a constant flux density at the satellite, or a constant signal to noise ratio at the remote station, or both, without requiring signal quality reports from a remote station, and without requiring a satellite beacon.

SUMMARY OF THE INVENTION

Accordingly, it is an object of the present invention to provide a satellite communication system wherein automatic uplink power control is used to compensate for attenuation of signals within the system.

It is another object of the present invention to provide a satellite communication system wherein a constant flux density is maintained at the satellite.

It is yet another object of the present invention to provide a satellite communication system wherein a constant signal to noise ratio is maintained at a signal receiver.

It is yet another object of the present invention to provide a satellite communication system wherein automatic uplink power control is performed at a hub station without requiring signal quality reports from a remote station.

It is yet another object of the present invention to provide a satellite communication system wherein automatic uplink power control is performed at a hub station without requiring a satellite beacon receiver.

Those and other objects and features of the present invention are accomplished, as embodied and fully described herein, by a method for compensating for signal attenuation in a satellite communication system comprising the steps of: transmitting a first signal to a satellite via an uplink path; receiving a second signal from the satellite via a downlink path; monitoring a first value, wherein the first value is a measured level of the first signal within the second signal relative to a reference level of the first signal within the second signal; and estimating an amount of attenuation along the uplink path, based on the first value and the frequencies of the first and second signals. This method may further include a step for controlling the output power of the first signal based on the estimated amount of attenuation.

Those and other objects and features of the present invention are further accomplished, as embodied and fully described herein, by a method for compensating for signal attenuation in a satellite communication system comprising the steps of: transmitting a first signal to a satellite via an uplink path; receiving a second signal from the satellite via a downlink path; extracting a third signal from the second signal by cancelling the first signal from the second signal; monitoring a first value, wherein the first value is a measured level of the first signal within the second signal relative to a reference level of the first signal within the second signal; monitoring a second value, wherein the second value is a measured energy per bit to noise power spectral density ratio ($E_b/N_0$) of the third signal relative to a reference $E_b/N_0$ of the third signal; and estimating an amount of attenuation along a forward channel, based on the first and second values and the frequencies of the first and second signals. This method may further include a step for controlling the output power of the first signal based on the estimated amount of attenuation.

With those and other objects, advantages, and features of the invention that may become hereinafter apparent, the nature of the invention may be more clearly understood by reference to the following detailed description of the invention, the appended claims, and the several drawings attached herein.

DETAILED DESCRIPTION OF THE PREFERRED EMBODIMENTS

Figure 1:
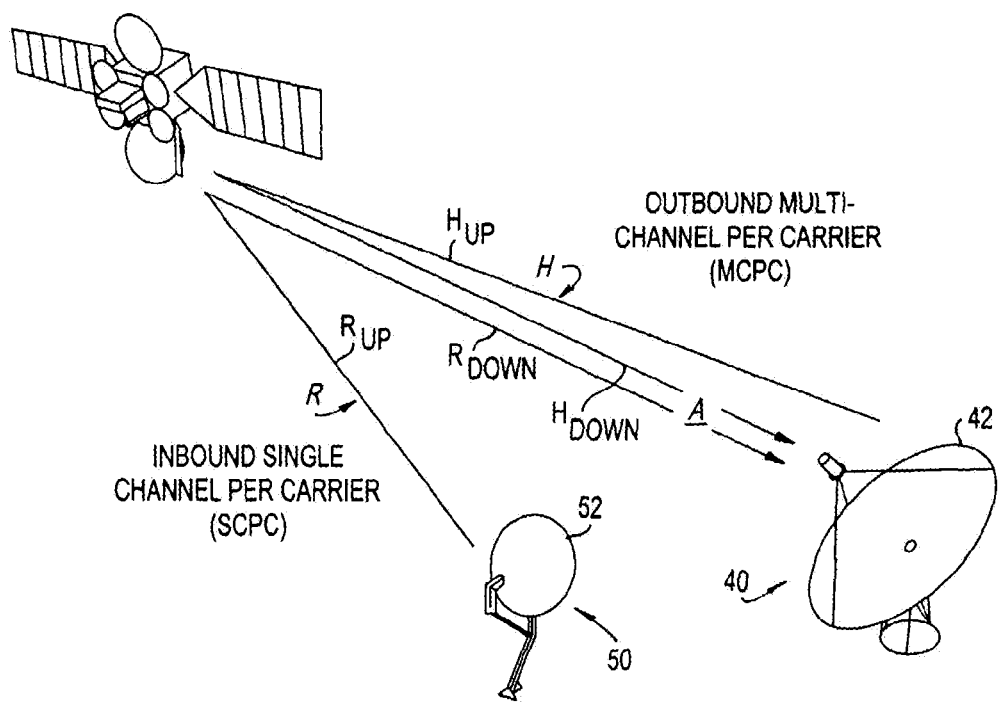
FIG. 1 shows a satellite communication system in accordance with the present invention.

Several preferred embodiments of the invention are described for illustrative purposes, it being understood that the invention may be embodied in other forms not specifically shown in the drawings.

Turning first to FIG. 1, shown therein is a satellite communication system in accordance with the present invention. The system includes a satellite 30, a hub station 40 having a hub antenna 42, and a remote station 50 having a remote antenna 52. Preferably, the hub antenna 42 is a large aperture antenna, and the remote antenna 52 is a very small aperture terminal (VSAT). The hub antenna 42 and the remote antenna 52 are each in communication with the satellite 30, and are each capable of transmitting and receiving signals. Thus, the hub station 40 and the remote station 50 may communicate with one another via the satellite 30. The hub station 40 and the remote station 50 may each include one or more processors and memory devices for processing and storing signals, including signals transmitted from and received by the hub antenna 42 and the remote antenna 52, respectively.

Figure 1A:
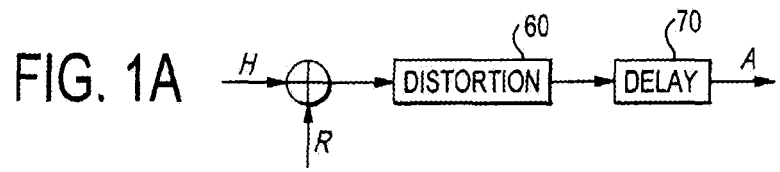
FIG. 1A is a block diagram showing transmitted and received signals in accordance with the present invention.

The hub station 40 transmits a hub signal H using the hub antenna 42, and the remote station 50 transmits a remote signal R using the remote antenna 52. The hub signal H is transmitted from the hub station 40 to the satellite 30 as an uplink signal $H_{up}$, and is transmitted from the satellite 30 back to the hub station 40 as a downlink signal $H_{down}$. The hub signal H, therefore, is shown having two legs, $H_{up}$ and $H_{down}$. The remote signal R is transmitted from the remote station 50 to the satellite 30 as an uplink signal $R_{up}$, and is transmitted from the satellite 30 to the hub station 40 as a downlink signal $R_{down}$. The remote signal R, therefore, is shown having two legs, $R_{up}$ and $R_{down}$. The hub antenna 42 receives a signal A, which is an aggregate of the hub signal H and the remote signal R. At the hub station 40, the power spectral density of the received remote signal R, which is a component of A, is typically smaller than the power spectral density of the received hub signal H, also a component of A, by approximately the hub-to-VSAT antenna gain ratio. As shown in FIG. 1A, the aggregate signal A may be affected by distortion 60 and delay 70 prior to being received at the hub station 40. Distortion 60 may be caused by non-linear amplitude and phase responses of a satellite transponder. The delay 70 is the time required for the hub signal H to travel from the hub station 40 to the satellite 30 and back to the hub station 40.

The present invention employs interference cancellation at the hub station 40 to cancel the hub signal H from the aggregate signal A, after which the remote signal R may be demodulated. The present invention also employs interference cancellation to estimate the attenuation $A_{Hup}$ of the hub uplink signal $H_{up}$, and compensates for this attenuation $A_{Hup}$ using automatic uplink power control. FIG. 1 illustrates an exemplary application of the present invention in which the hub station 40 transmits a multi-channel per carrier (MCPC) signal and the remote station 50 receives a single channel per carrier (SCPC) signal.

The present invention is particularly useful in a spectral reuse satellite communication system, or a satellite communication system in which the uplink frequency of the hub signal H is the same as the uplink frequency of the remote signal R, and the downlink frequency of the hub signal H is the same as the downlink frequency of the remote signal R. Such a system ensures that the aggregate signal A may be received by a single receiver at the hub station 50, and may be processed as described below. Thus, the system obviates the need for a second receiver at the hub station 50, as is traditionally the case in systems that employ a beacon receiver at the hub station, in which the frequency of the received beacon signal is translated to the frequency of a received hub signal.

1. Automatic Uplink Power Control with Interference Cancellation

The attenuations $A_{Hup}$ and $A_{Hdown}$ of the hub uplink signal $H_{up}$ and hub downlink signal $H_{down}$, respectively, are estimated at the hub station 40 by monitoring the level of the hub signal H in the received aggregate signal A. The level of the hub signal H in the received aggregate signal A is denoted as H-in-A. A currently measured value of H-in-A is denoted as H-in-$A_{current}$. $\Delta$H-in-A is defined as: $\Delta$H-in-A=H-in-$A_{reference}$−H-in-$A_{current}$, where H-in-$A_{reference}$ is the value of H-in-A under clear-sky conditions at both the hub station 40 and the remote station 50. Preferably, H-in-$A_{reference}$ is determined by measurement and calculation, as explained below, at the time the system of the present invention is installed. Subsequent updates to H-in-$A_{reference}$ are made at times in which changes are made to the earth station equipment employed by the system.

Figure 2:
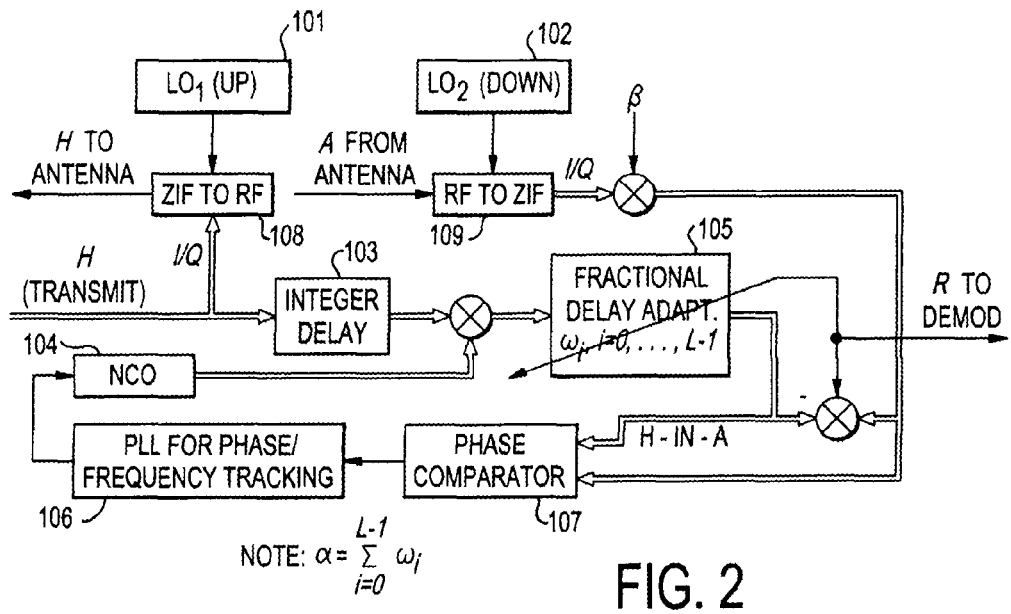
FIG. 2 is a block diagram showing interference cancellation in accordance with the present invention.

FIG. 2 is a block diagram depicting interference cancellation at the hub station 40 in accordance with the present invention. As shown in FIG. 2, the received aggregate signal A is digitized (at a sampling rate consistent with the signal bandwidth) and down-converted to baseband at a down-converter 109 by mixing with a local oscillator 102. The down-converted signal is multiplied by a factor β. Scaling by β is required to avoid overflow of adaptive filter coefficients. A baseband version of the hub signal H is up-converted at an up-converter 108 by mixing with a local oscillator 101, and the up-converted hub signal H is sent to be transmitted via the hub antenna 42. In addition, the baseband hub signal H is delayed by an integer delay 103, the output of which is mixed with a numerically controlled oscillator 104 before it enters a fractional delay adaptive filter 105. The difference between the output of the adaptive filter 105 and the product of the baseband aggregate signal A and the factor β is used to drive the adaptive filter 105 via a least mean square adaptive algorithm. In addition, the output of the adaptive filter 105 and the product of the baseband aggregate signal A and the factor β are received by a phase comparator 107, the output of which is used to drive a phase-locked loop 106, which in turn controls the numerically controlled oscillator 104, the output of which is mixed with the output of the integer delay 103.

A result of the interference cancellation process depicted in FIG. 2 is the acquisition of a baseband version of the remote signal R, which may be demodulated at the hub station 40 following interference cancellation. The baseband remote signal R is the difference between the output of the adaptive filter 105 and the product of the baseband aggregate signal A and the factor β.

Another result of the interference cancellation process depicted in FIG. 2 is the determination of H-in-A, which is the output of the adaptive filter 105. H-in-A (in dB) is computed from the least mean square of the gain α of the adaptive filter, as $20 \cdot \log_{10}(\alpha/\beta)$, where $\alpha = \Sigma w_i$; i=0, . . . , L−1. Saturation of inputs is avoided by scaling the H and A inputs using automatic gain control (AGC). The down-converter 109 may include a fixed gain amplifier, an automatic gain control, an analog-to-digital converter, and an RF to ZIF converter. When there are changes in H and/or A input levels, AGC scales the input signals according to the dynamic range of the analog-to-digital converter. Then β (including changes in AGC, if any) is adapted such that A=0.5·H. The interference cancellation process may be employed at the hub station 40 to determine both H-in-$A_{reference}$ and H-in-$A_{current}$, and thus ΔH-in-A, which is defined as H-in-$A_{reference}$−H-in-$A_{current}$. The following explanation details how the results of interference cancellation are used by the hub station 40 to perform automatic uplink power control.

The total attenuation (in dB) of the hub signal H, which is transmitted from and received by the hub station 40, is:

$$A_{Hup} + A_{Hdown} = [\Delta H\text{-in-}A]_{dB} \quad (1).$$

It has been shown, for example, in R. K. Crane, "Prediction of Attenuation by Rain," *IEEE Transactions on Communications*, Vol. COM-28, pp. 1717-1733, September 1980, the entirety of which is incorporated herein by reference, that the non-linear, frequency dependent rain attenuation (in dB/km) of a transmitted signal may be computed as $a \cdot R_p^b$, where $R_p$ is the point rain rate (in mm/hr) and a and b are frequency dependent constants given in Table I below.

TABLE I

PARAMETERS FOR COMPUTING SPECIFIC ATTENUATION
$a \cdot R_p^b$ (dB/km)

| Frequency F - GHz | Multiplier a(F) | Exponent b(F) |
| --- | --- | --- |
| 1 | 0.00015 | 0.95 |
| 4 | 0.00080 | 1.17 |
| 5 | 0.00138 | 1.24 |
| 6 | 0.00250 | 1.28 |
| 7.5 | 0.00482 | 1.25 |
| 10 | 0.0125 | 1.18 |
| 12.5 | 0.0228 | 1.145 |
| 15 | 0.0357 | 1.12 |
| 17.5 | 0.0524 | 1.105 |
| 20 | 0.0699 | 1.10 |
| 25 | 0.113 | 1.09 |
| 30 | 0.170 | 1.075 |
| 35 | 0.242 | 1.04 |
| 40 | 0.325 | 0.99 |
| 50 | 0.485 | 0.90 |
| 60 | 0.650 | 0.84 |
| 70 | 0.780 | 0.79 |
| 80 | 0.875 | 0.753 |
| 90 | 0.935 | 0.730 |
| 100 | 0.965 | 0.715 |

For uplink and downlink frequencies $f_{up}$ and $f_{down}$ and a hub rain rate of $$a(f_{up}) \cdot R_H^{b(fup)} + a(f_{down}) \cdot R_H^{b(fdown)} = [\Delta H\text{-in-}A]_{dB} \quad (2).$$

In order to determine the uplink and downlink attenuations, we consider the ratio of the uplink and downlink attenuations (both in dB):

$$a(f_{up}) \cdot R_H^{b(fup)} / a(f_{down}) \cdot R_H^{b(fdown)} = [a(f_{up})/a(f_{down})] \cdot R_H^{b(fup)-b(fdown)} \quad (3).$$

Table I shows that $b(f_{up})-b(f_{down})$ is small (typically less than 0.1). Thus, for a wide range of rain rates, say 0.2 mm/hr<$R_H$<10 mm/hr, $R_H^{b(fup)-b(fdown)}$ is approximated by unity, and the ratio of uplink and downlink attenuations is approximated by $a(f_{up})/a(f_{down})$, a constant depending on $f_{up}$ and $f_{down}$. Hence, the uplink attenuation (in dB) may be related to the downlink attenuation by:

$$A_{Hup} = K \cdot A_{Hdown} \quad (4),$$

where K is an up-down frequency dependent fade ratio. In the Ku-band, $f_{up}$ and $f_{down}$, which are governed by satellite communication standards, are typically 14 GHz and 12 GHz, respectively. Hence, the up-down attenuation ratio K is about 1.5. $A_{Hup}$ and $A_{Hdown}$ can be solved by substituting equation (4) in equation (1).

$$A_{Hup} = (K \cdot \Delta H\text{-in-}A)/(1+K) \quad (5).$$

$$A_{Hdown} = (\Delta H\text{-in-}A)/(1+K) \quad (6).$$

Accordingly, the uplink attenuation $A_{mip}$ may be compensated during a fade by increasing the power of the hub signal H at the output of the hub antenna 42 by an amount of $A_{Hup}$. It can also be seen that the estimated value of $[H\text{-in-}A]_{dB}$ is invariant with respect to changes in the level of the hub signal H (perhaps made at the output of the modulator output in order to increase the power of H). Thus, results (5) and (6) apply regardless of the level of H. This is advantageous for both constant satellite flux density automatic uplink power control, explained above, as well as link automatic uplink power control, described below.

In an example of the automatic uplink power control with interface cancellation in the Ku-band, suppose that, under rainy conditions, H-in-A is 3 dB less than H-in-A under clear-sky conditions. Then, $\Delta H\text{-in-}A = A_{Hup} + A_{Hdown} = 3$ dB.

Further, suppose that the rain rate is 1 mm/hr so that $A_{Hup}/A_{Hdown}=1.5$. $A_{Hup}$, therefore, is $(1.5\cdot3\text{ dB})/(1+1.5)=1.8$ dB. The system may compensate for this 1.8 dB attenuation by increasing the output power of the hub signal H by 1.8 dB. This compensation ensures a constant flux density at the satellite 30.

2. Link Automatic Uplink Power Control

In link based automatic uplink power control, the transmit power of a hub antenna 42 is adjusted such that a receiver at the remote station 50 is able to demodulate a received signal at an acceptable error rate even under fade conditions. Conventionally, as described in U.S. Pat. App. Pub. No. 2008/0274690, a remote station sends information regarding a received signal quality via return channel overhead information, for uplink power control. According to the present invention, which is interference cancellation based, the received signal quality at the remote station 50 is inferred from information available at the hub station 40, without feedback from the remote station 50, for uplink power control.

Figure 3:
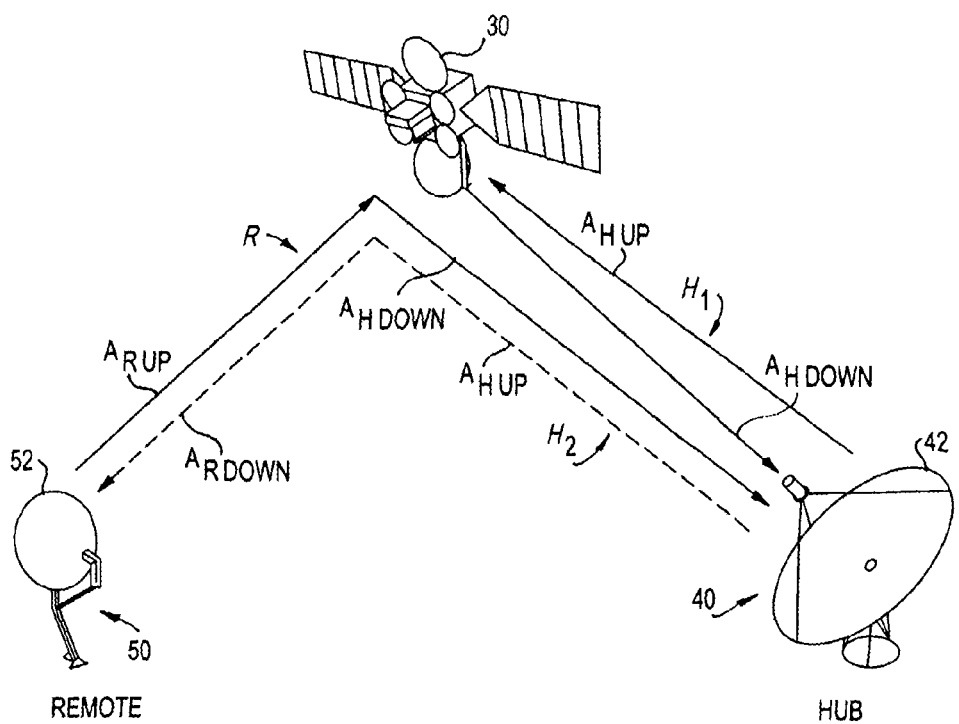
FIG. 3 shows a satellite communication system in accordance with the present invention, wherein labels are provided to show the levels of attenuation along signal paths.

Turning to FIG. 3, shown therein is a satellite communication system in accordance with the present invention in which a hub signal, denoted $H_1$, follows a hub transmit to hub receive path (shown by solid lines) from the hub station 40 up to the satellite 30, and back down to the hub station 40. The hub signal $H_1$ is attenuated by an amount $A_{Hup}$ along the hub uplink, and by an amount $A_{Hdown}$ along the hub downlink. The hub signal, also denoted $H_2$, follows a hub transmit to remote receive path (shown by dashed lines) from the hub station 40 up to the satellite 30, and down to the remote station 50. A remote signal R, follows a remote transmit to hub receive path (shown by solid lines) from the remote station 50 up to the satellite 30, and down to the hub station 40. The remote signal R is attenuated by an amount $A_{Rup}$ along the remote uplink, and by an amount $A_{Hdown}$ along the hub downlink. The attenuation along the hub transmit to remote receive path followed by the hub signal $H_2$ (i.e., the forward channel, shown by dashed lines, from the hub station 40 to the satellite 30 to the remote station 50) is inferred from the signal attenuations along the paths shown by solid lines. The invention, as shown in FIG. 3, is advantageous in that there is no communication overhead for feedback of link quality. In addition, the invention, as shown in FIG. 3, is advantageous in that the system is more responsive because the lag associated with the system is only half that of conventional link automatic uplink power control, which requires signal quality reports to be sent from a remote station to a hub station.

A fade in the remote transmit to hub receive path is determined by monitoring the degradation in the measurement of $E_b/N_0$ at a demodulator at the hub station 40 relative to a reference value of $E_b/N_0$ under clear-sky conditions. $\Delta E_b/N_0$ is defined as the difference between the reference value of $E_b/N_0$ and a measured value of $E_b/N_0$. $\Delta E_b/N_0$ due to fade is equal to the sum of the remote uplink attenuation $A_{Rup}$ and the hub downlink attenuation $A_{Hdown}$:

$$\Delta E_b/N_0 = A_{Rup} + A_{Hdown} \quad (7).$$

In order to compensate for this fade, the total attenuation along the hub transmit to remote receive path is inferred. From equation (4), we have:

$$A_{Hup} + A_{Rdown} = A_{Hup} + A_{Rup}/K \quad (8).$$

From equation (7), we have:

$$A_{Hup} + A_{Rdown} = A_{Hup} + (\Delta E_b/N_0 - A_{Hdown})/K \quad (9).$$

Now, substituting $A_{Hup} + A_{Hdown}$ from equations (5) and (6), we have:

$$A_{Hup}+A_{Rdown}=[(K\cdot\Delta H\text{-in-}A)/(1+K)]+[\Delta E_b/N_0-(\Delta H\text{-in-}A)/(1+K)]/K \Rightarrow A_{Hup}+A_{Rdown}=[\Delta H\text{-in-}A\cdot(K-1)+\Delta E_b/N_0]/K \quad (10).$$

Equation (10) addresses the uplink power control required in all three of the following fade scenarios: raining at both the hub station 40 and the remote station 50; raining at only the remote station 50; and raining at only the hub station 40. In the case of rain only at the remote station 50, the right hand side of equation (10) simplifies to $(\Delta E_b/N_0)/K$, which is the required compensation term $A_{Rdown}$. In the case of rain only at the hub station 40, the right hand side of equation (10) simplifies to $[(K\cdot\Delta H\text{-in-}A)/(1+K)]$, which is the required compensation term $A_{Hup}$.

In an example of link automatic uplink power control in the Ku-band, suppose that, under rainy conditions, $\Delta H\text{-in-}A$ is 4 dB and $\Delta E_b/N_0$ is 2 dB. Further, suppose the rain rate at the hub station 40 is 1 mm/hr and the rain rate at the remote station 50 is 0.5 mm/hr so that $A_{Hup}/A_{Hdown}=A_{Rup}/A_{Rdown}=1.5$. $A_{Hup}+A_{Rdown}$, therefore, is $[4\text{ dB}\cdot(1.5-1)+2\text{ dB}]/1.5=2.67$ dB. In this example, the system may compensate for the 2.67 dB attenuation by increasing the output power of the hub signal H by 2.67 dB.

To maximize effective isotropic radiated power (EIRP), it is desirable to operate the satellite transponder in a near-saturated state. In some instances the remote downlink attenuation may be so great that compensation along the forward path by automatic uplink power control alone would call for the saturation of the satellite transponder. In such situations, the system may avoid the saturation of the satellite transponder by employing automatic uplink power control to compensate for the hub uplink attenuation, and employing adaptive coding and modulation to compensate for the remote downlink attenuation. In employing automatic uplink power control and adaptive coding and modulation, the system utilizes the estimates for $A_{Hup}$ and $A_{Rdown}$, which are described above. Accordingly, the system achieves a desired link performance without requiring the transmission of signal quality reports from the remote station 50 to the hub station 40.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method for compensating for signal attenuation in a satellite communication system comprising the steps of:
    transmitting a first signal to a satellite via an uplink path;
    receiving a second signal from the satellite via a downlink path;
    monitoring a first value, wherein the first value is a measured level of the first signal within the second signal relative to a reference level of the first signal within the second signal; and
    estimating an amount of attenuation along the uplink path, based on the first value and the frequencies of the first and second signals.

2. The method of claim 1 further comprising the step of controlling the output power of the first signal based on the estimated amount of attenuation.

3. The method of claim 1, wherein the step of estimating an amount of attenuation along the uplink path includes solving the equation $A_{Hup}=(K\cdot\Delta H\text{-in-}A)/(1+K)$, wherein $A_{Hup}$ is the estimated amount of attenuation,
wherein $\Delta H$-in-$A$ is the first value, and
wherein K is a frequency dependent fade ratio.

4. The method of claim 1, wherein the satellite communication system is a spectral reuse satellite communication system.

5. A method for compensating for signal attenuation in a satellite communication system comprising the steps of:
   transmitting a first signal to a satellite via an uplink path;
   receiving a second signal from the satellite via a downlink path;
   extracting a third signal from the second signal by cancelling the first signal from the second signal;
   monitoring a first value, wherein the first value is a measured level of the first signal within the second signal relative to a reference level of the first signal within the second signal;
   monitoring a second value, wherein the second value is a measured energy per bit to noise power spectral density ratio ($E_b/N_0$) of the third signal relative to a reference $E_b/N_0$ of the third signal; and
   estimating an amount of attenuation along a forward channel, based on the first and second values and the frequencies of the first and second signals.

6. The method of claim 5 further comprising the step of controlling the output power of the first signal based on the estimated amount of attenuation.

7. The method of claim 5, wherein the first signal originates at a first antenna, wherein the third signal originates at a second antenna, and wherein the forward channel comprises a path from the first antenna to the satellite to the second antenna.

8. The method of claim 7, further comprising the step of performing adaptive coding and modulation to compensate for an amount of attenuation along the path from the satellite to the second antenna.

9. The method of claim 5, wherein the step of estimating an amount of attenuation along a forward channel includes solving the equation $$A_{Hup}+A_{Rdown}=[\Delta H\text{-in-}A\cdot(K-1)+\Delta E_b/N_0]/K,$$

wherein $A_{Hup}+A_{Rdown}$ is the estimated amount of attenuation,
wherein $\Delta H$-in-$A$ is the first value,
wherein $\Delta E_b/N_0$ is the second value, and
wherein K is a frequency dependent fade ratio.

10. The method of claim 5, wherein the satellite communication system is a spectral reuse satellite communication system.

11. A hub station for use with a satellite communication system, the hub station comprising:
    a means for transmitting a first signal to a satellite via an uplink path;
    a means for receiving a second signal from a satellite via a downlink path;
    a means for monitoring a first value, wherein the first value is a measured level of the first signal within the second signal relative to a reference level of the first signal within the second signal; and
    a means for estimating an amount of attenuation along the uplink path, based on the first value and the frequencies of the first and second signals.

12. The hub station of claim 11 further comprising a means for controlling the output power of the first signal based on an estimated amount of attenuation along the uplink path.

13. The hub station of claim 11, wherein the satellite communication system is a spectral reuse satellite communication system.

14. A hub station for use with a satellite communication system, the hub station comprising:
    a means for transmitting a first signal to a satellite via an uplink path;
    a means for receiving a second signal from a satellite via a downlink path;
    a means for extracting a third signal from the second signal by cancelling the first signal from the second signal;
    a means for monitoring a first value, wherein the first value is a measured level of the first signal within the second signal relative to a reference level of the first signal within the second signal; and
    a means for monitoring a second value, wherein the second value is a measured energy per bit to noise power spectral density ratio ($E_b/N_0$) of the third signal relative to a reference $E_b/N_0$ of the third signal; and
    a means for estimating an amount of attenuation along a forward channel, based on the first and second values and the frequencies of the first and second signals.

15. The hub station of claim 14 further comprising a means for controlling the output power of the first signal based on an estimated amount of attenuation along the forward channel.

16. The hub station of claim 14, further comprising a means for performing adaptive coding and modulation to compensate for an estimated amount of attenuation along the forward channel.

17. The hub station of claim 14, wherein the satellite communication system is a spectral reuse satellite communication system.

* * * * *